Feb. 8, 1955   J. P. McCARTIN   2,701,481
POWER TRANSMISSION

Filed July 1, 1953   2 Sheets-Sheet 1

INVENTOR.
Joseph P. McCartin
BY Edwin Leinster &
Harry Cohen
ATTORNEYS

Feb. 8, 1955

J. P. McCARTIN 2,701,481

POWER TRANSMISSION

Filed July 1, 1953

INVENTOR.
Joseph P. McCartin
BY Edwin Levisohn &
Harry Cohen
ATTORNEYS

United States Patent Office 2,701,481
Patented Feb. 8, 1955

2,701,481

POWER TRANSMISSION

Joseph P. McCartin, Flushing, N. Y., assignor to Nit-Ra-Cam Corporation, Flushing, N. Y., a corporation of New York Application July 1, 1953, Serial No. 365,365

18 Claims. (Cl. 74—751)

This invention relates generally to improvements in power transmission apparatus, and, more particularly to improvements in power transmission apparatus of the mechanical type which is adapted to transmit a predetermined ratio of the input power to an output member to rotate the latter.

One object of the present invention is the provision of an improved mechanical type of power transmission in which the power applied to an input member is automatically converted to an optimum ratio with a maximum of efficiency, said ratio being a function of the resistance to be overcome and the velocity of rotation of the input member.

Another object of the present invention is the provision of an improved power transmission of the aforenoted character which is adapted to automatically accommodate itself to sudden application of power at the transmission input or sudden increases of resistance at the transmission output without adverse effect to the component parts of the transmission.

Yet another object of the present invention is the provision of generally improved power transmission apparatus of the aforenoted character which is of simple design and construction, utilizes a minimum number of moving parts, and which is economical to manufacture and highly efficient in the accomplishment of its intended purposes.

The above and other objects, features and advantages of the present invention will be more fully understood from the following description considered in connection with the accompanying illustrative drawings.

In the drawings which illustrate the best mode now contemplated by me for carrying out my invention:

Figure 1:
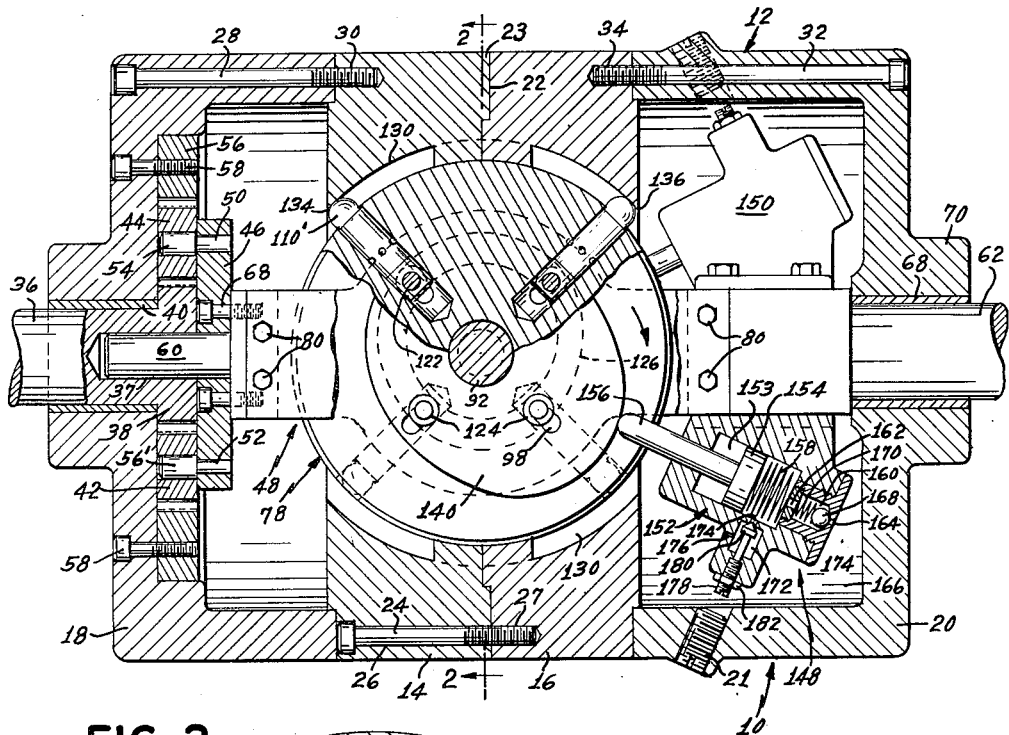
Fig. 1 is a longitudinal sectional view through the power transmission apparatus formed according to the present invention.
Figure 2:
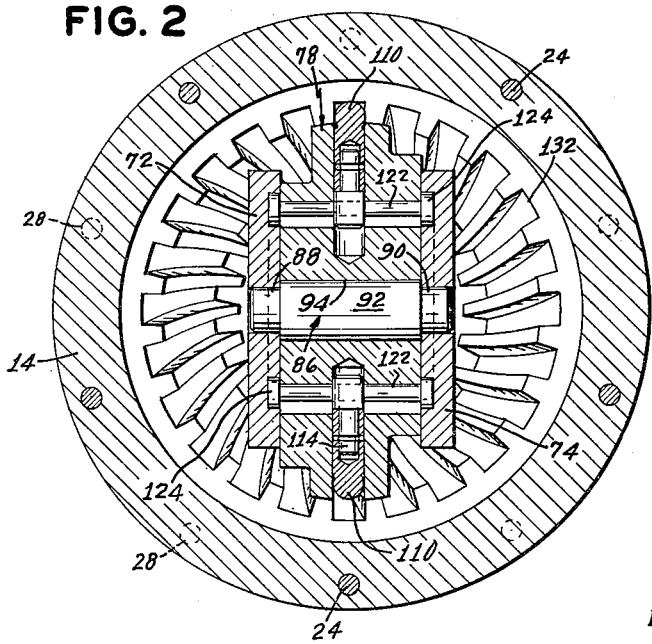
Fig. 2 is a sectional view taken on the line 2—2 of Fig. 1.
Figure 3:
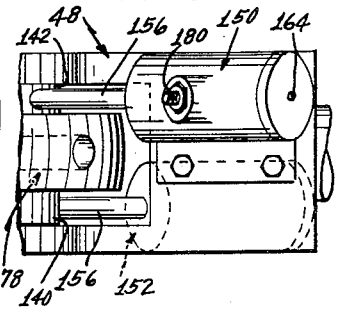
Fig. 3 is a fragmentary top plan view of a portion of the power transmission apparatus.

Referring to the drawings, and more particularly to Figs. 1–3 thereof, there is shown power transmission apparatus 10 formed according to the present invention which comprises a casing 12 having mating inner casing parts 14 and 16 and complementary casing parts 18 and 20 secured to the inner casing parts 14 and 16, respectively, in the manner now to be described. The casing part 16 is provided with a peripherally extending groove 22 which is adapted for the reception of the peripherally extending shoulder 23, the casing parts 14 and 16 being removably maintained in assembled condition by means of the bolts 24 which are spaced peripherally of the parts 14 and 16. It will be understood that the casing part 14 is provided with peripherally spaced apertures 26 which are adapted for the reception of the bolts 24 and that the inner casing part 16 is provided with a corresponding number of peripherally spaced tapped apertures 27 which are adapted to be aligned with the apertures 26 for the reception of the bolts 24. The outer casing part 18 is secured to the inner casing part 14 by means of the peripherally spaced bolts 28 which are adapted to be received in the tapped apertures 30 defined in the inner casing part 14. Similarly, the outer casing part 20 is adapted to be removably secured to the inner casing part 16 by means of the peripherally spaced bolts 32 which are adapted to be received in the tapped apertures 34 of the inner casing part 16. It will be readily apparent from the above that the casing parts 14, 16, 18 and 20 are adapted for removable assembly by the bolts, as aforedescribed, wherefore the casing 12 may be readily disassembled by the removal of the assembly bolts. The input shaft 36 of the transmission apparatus 10 is provided with a spur gear 38 at its inner end, said input shaft being journalled for rotation in the bearing 40 which is secured to the casing part 18 in any suitable manner. The spur gear 38 carried by the input shaft 36 is adapted for interengagement with the planetary gears 42 and 44 which are carried by the plate 46, the latter being secured to the main rotor 48 and rotatable therewith. More particularly, the rotatable plate 46 is provided with spaced pins 50 and 52 which are secured thereto and which are provided with projecting portions 54 and 56', respectively, which carry the planetary gears 42 and 44. It will be understood that the planetary gear 42 is mounted for rotation on the portion 56' and that the planetary gear 44 is mounted for rotation on the portion 54, the rotation of the plate 46 being effective to concomitantly move the planetary gears 42 and 44. The planetary gears 42 and 44 are adapted for meshing engagement with the internal gear 56 which is secured to the outer casing part 18 by means of a plurality of peripherally spaced bolts 58. Thus the internal gear 56 is in fixed relation with the casing 12 and said internal gear is formed complementary to the planetary gears 42 and 44 aforedescribed, said planetary gears being in operative relation relative to the internal gear 56 in the manner to described in detail hereinafter. It is therefore here to be noted that the planetary gears 42 and 44 have their axes in fixed relation with the plate 46 and said axes are accordingly in fixed relation with the main rotor 48 whereas the internal gear 56, which is in meshing engagement with said planetary gears, is in fixed relation with the casing 12 and, more particularly, with the outer casing part 18 thereof.

Figure 8:
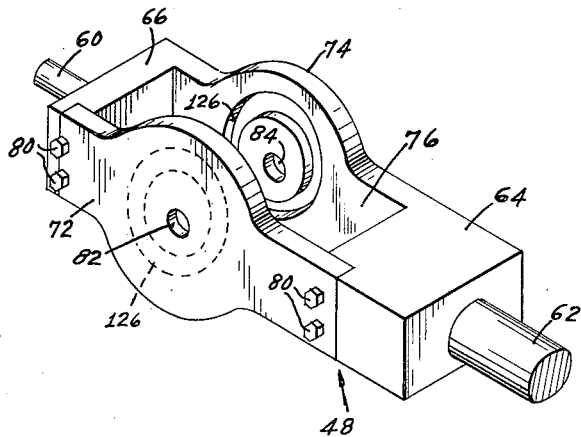
Fig. 8 is a perspective view of the main rotor.

With reference to Figs. 1 and 8, the main rotor 48 comprises the longitudinally spaced shafts 60 and 62 which are in axial alignment and which project outwardly of the body part 64 of said rotor. The shaft 62 of the main rotor 48 constitutes the output shaft of the instant power transmission and is adapted to be coupled to the driven load in any conventional manner. However, it is to be understood that the hub 70 of casing 20 may constitute the output means, if desired. The plate 46 aforedescribed, which carries the planetary gears 42 and 44, is secured to the part 66 of the rotor 48 by means of the bolts 68. Accordingly plate 46 and rotor 48 are in fixed relation whereby the rotation of the plate 46 in the manner to be described in detail hereinafter will be effective to concomitantly rotate the main rotor 48 which carries the output shaft 62. The output shaft 62 is journalled for rotation in the bearing 68 which is carried by the portion 70 of the outer casing part 20. It will therefore be apparent from the above that the main rotor 48 is adapted for rotation about the axis which is coincident with the axes of the shafts 60 and 62. Accordingly, the rotation of the plate 46 in response to the rotation of the input shaft 36 will be effective to rotate the main rotor 48 about the axes of the shafts 60 and 62, which as aforepointed out are in longitudinal alignment.

The main body part 64 of the rotor 48 is provided with a pair of laterally spaced walls 72 and 74 which define the recess 76 which extends through said rotor, said recess being adapted for the reception of the auxiliary rotor 78 in the manner to be described in detail hereinafter. It is to be noted that the wall 72 of the rotor 48 is removably mounted to the body part 64 of said rotor by means of the bolts 80. The laterally spaced walls 72 and 74 are apertured therethrough as indicated at 82 and 84 respectively, said apertures being in alignment and adapted to rotatably mount the shaft 86. The shaft 86 is provided with end shaft portions 88 and 90 which are adapted to be received in the apertures 82 and 84, respectively of the main rotor 48. Accordingly the shaft 86 is journalled for rotation in the laterally spaced walls 72 and 74, it being noted that the axis of the shaft 86 is disposed at right angles to the axes of the shafts 60 and 62. The part 92 of the shaft 86 is adapted to be received in the aperture 94 of the auxiliary rotor 78, said shaft being preferably secured in fixed relation with said auxiliary rotor in any desired manner, for example by a press fit whereby it will be apparent that the rotor 78 is adapted for rotation about the axis of the shaft 86. Thus the auxiliary rotor 78 is adapted to be received in the recess 76 defined between the walls 72 and 74 and the rotor 78 is adapted for rotation in said recess about the axis of the shaft 86 which is disposed at right angles to the axes of the shafts 60 and 62 of the main rotor 48. It will therefore be apparent that the auxiliary rotor 78 is adapted for rotation in the recess 76 about an axis which is disposed at right angles to the axis of rotation of the main rotor 48.

The auxiliary rotor 78 is provided with a plurality of peripherally spaced apertures 96, there being four such apertures in the instant embodiment which are spaced 90 degrees apart. Each of the apertures 96 is provided with an elongated slot 98 which communicates therewith and which is positioned near the bottom of said apertures, said slots being adapted for purposes which will be apparent from the description which follows. Each of the apertures 96 is formed in an identical manner and coacts with associated structure in an identical manner whereby only one of such apertures and its cooperating structure will be described in detail hereinafter.

Figures 4, 7:
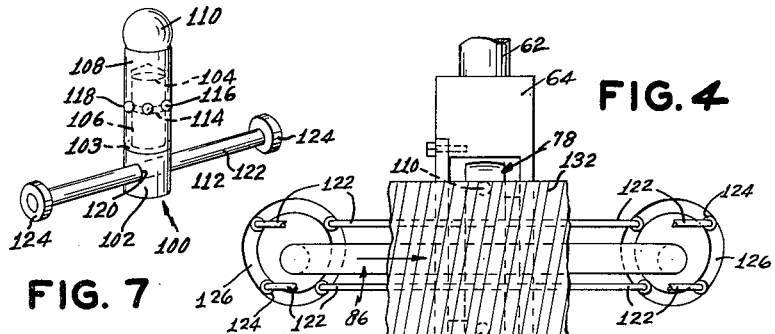
Fig. 4 is a schematic view illustrating the operation of the instant power transmission apparatus.
Fig. 7 is a perspective view of one of the driving elements and associated operating mechanism.
Figure 5:
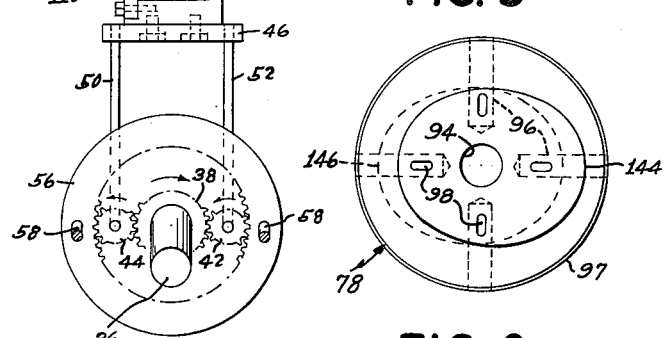
Fig. 5 is a side elevational view of the auxiliary rotor.
Figure 6:
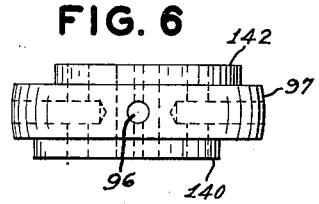
Fig. 6 is a top plan view thereof.

Operatively associated with each of the recesses 96 of the auxiliary rotor 78 is a driving element 100 (Fig. 7) which is of elongated configuration and is formed complementary to the apertures 96. The driving element 100 is adapted for reciprocation in an aperture 96 in the manner to be described hereinafter. The driving element 100 comprises a base part 102 having an axially projecting pin 104 which is adapted to be received in the closed bottom aperture 106 which extends in the part 108 of said driving element. The part 108 of the driving element 100 terminates at its upper end in a ball element 110, said ball element being adapted for a purpose which will be evident from the description which follows. It will be understood that the pin 104 is formed complementary to the closed bottom aperture 106 of part 108 and the latter is adapted for rotation relative to the part 102 about the longitudinal axes of said parts. The base part 102 is provided with a peripherally extending shoulder 103 which is adapted for the seating thereon of adjacent portions of the part 108. The pin 104 of the part 102 is provided with a peripherally extending groove 114, said groove being adapted for the reception of the balls 116. The part 108 is provided with a series of four peripherally spaced apertures 118 which are positioned on the part 108 corresponding to the positioning of groove 114. Each of the side wall apertures 118 of the part 108 is adapted for the reception of a ball 116 which is adapted to be seated in the peripherally extending groove 114 whereby to provide for the rotation of the part 108 about its longitudinal axis and to prevent the axial displacement of the part 108 relative to the base part 102. Thus the balls 116 are adapted to be seated in the peripherally extending groove 114 and to project into a companion aperture 118 of part 108 whereby to provide for the rotation of the part 108 about its longitudinal axis and to prevent the axial displacement of said part relative to the base part 102. The part 102 is provided with an aperture 120 which extends transversely therethrough, said aperture being adapted for the reception of the shaft 122 which carries the rollers 124 at its extremities, said rollers being secured to the shaft 122 in any conventional manner. It will be understood that the transverse aperture 120 is dimensioned complementary to the companion shaft 122 and that the latter is rotatably mounted in said aperture. The shaft 122 is adapted to extend through an elongated slot 98 of its companion aperture 96, said slot being elongated so as to provide clearance for the movement of the shaft 122 during its cycle of operation in the manner to be described hereinafter.

The laterally spaced walls 72 and 74 at their confronting inner faces are provided with cam slots 126 which are adapted for the reception of the rollers 124 carried by the shaft 122. It will be noted that the cam slots 126 are eccentrically positioned relative to the apertures 82 and 84, said cam slots being structurally similar and in transverse alignment. Thus the rollers 124 are adapted to ride in their companion cam slots 126, said cam slots being adapted to control the axial reciprocatory movement of the driving elements 100. Thus the auxiliary rotor 78 is mounted for rotation about the axis of the shaft 86 whereas the positioning of the driving elements 100 in apertures 96 is adapted to be controlled by means of the cooperative association of the rollers 124 and the cam grooves or slots 126 defined in the main rotor 48.

The inner mating casing parts 14 and 16 have collectively defined therein a spherical inner surface 130 which in turn has defined therein a series of spiral grooves 132 which are dimensioned complementary to the ball elements 110 and are adapted for the reception thereof. It will be understood that the spirally extending grooves 132 defined in the inner spherical surface 130 of casing 12 are structurally similar and are uniformly spaced, said grooves being adapted to receive the terminal ball elements 110 of the driving elements 100 during part of one revolution of the cycle of operation of the auxiliary rotor 78. Each driving element 100 is adapted to be operatively associated with a companion groove 132 for a little over 90 degrees of rotation of the rotor 78 and just prior to the withdrawal of each driving element 100 from a companion groove 132 a succeeding driving element will enter its companion groove 132 whereby it will be apparent that one of said driving elements will be positioned in a companion groove at all times. Thus by way of example the ball element 110' will enter its companion groove 132 substantially at the point 134 as shown in Fig. 1 and will be withdrawn from said groove substantially at the point 136, the angular distance between the points 134 and 136 being a little over 90 degrees, whereby one of said ball elements will be operatively associated with a companion spiral groove at all times. The aforedescribed operative association between the ball elements 110 and the companion grooves 132 is effected by means of the cooperative association of the rollers 124 and the cam grooves 126. Thus the rollers 124, which ride in the cam grooves 126, will be effective to control the positioning of the ball elements 110 in the spiral grooves in the aforedescribed manner, it being apparent that the cam grooves 126 will be effective to project the ball elements 110 into their companion spiral grooves substantially between the points 134 and 136 as aforedescribed. Thus the cooperative association between the rollers 124 and the cam grooves 126 is effective to control the axial positioning of the driving elements 100 relative to the spiral grooves 132, it being apparent that said cooperative association is effective to project the ball elements 110 into a driving radius relative to said grooves during the desired part of the cycle of rotation of the auxiliary rotor 78. In the illustrated embodiment there are four driving elements 100 provided and 24 spiral grooves 132 are defined in the spherical surface 130 whereby it will be apparent that the auxiliary rotor is adapted to make six revolutions about its own axis to one revolution of said spherical surface. Accordingly, a complete cycle of operation between the auxiliary rotor 78 and the casing 12 will require six revolutions of the auxiliary rotor 78 about its own axis which will effect the operative association of each of the driving elements 100 with its companion series of spiral grooves 132. Thus the ball element 110 of the driving elements 100 is adapted to be operatively associated with a companion series of six spaced spiral grooves 132 during a complete cycle of operation relative to the casing 12. It is to be noted that the input shaft 36 is provided with a closed bottom aperture 37 at its inner end which is adapted for the reception of the shaft 60 of the main rotor 48.

In the illustrated embodiment the spiral grooves 132 are disposed substantially at a 7½ degree angle from a line parallel to the axis of rotation of the main rotor 48, it being understood that the aforenoted angle of the spiral grooves is given by way of example only to achieve a desired efficiency and is not critical in the operation of the instant power transmission. Accordingly in the illustrated embodiment the spiral grooves 132 are disposed substantially at a 7½ degree angle relative to the main axis of rotation and said grooves are spaced substantially 15 degrees apart whereby there is provided a total of 24 grooves. The inclination of the spiral grooves and their cooperative association with the ball elements 110 is diagrammatically illustrated in Fig. 4. The outer surface 97 of the auxiliary rotor 78 is formed substantially complementary to the inner spherical surface 130 of the casing parts 14 and 16, said outer surface 97 being spaced from the surface 130 a slight amount so as to provide the requisite degree of clearance between said surfaces during the movement of the driving elements 100 in their companion series of grooves 132. For certain power transmission applications it is desirable to govern the speed of rotation of rotor 78, and for this purpose there are provided governors 148 and 150 which are structurally identical whereby the structure and operation of one of the governors 148 only will be described in detail hereinafter. The rotor 78 is provided with a pair of cams 140 and 142 which are adapted to coact with the governors 148 and 150, respectively, said cams 140 and 142 having their high points 144 and 146, respectively, disposed in diametrically opposed relation relative to said rotor. The governor 148 comprises a casing 152 defining a cylinder 153 having a piston 154 disposed therein and adapted for reciprocatory movement. The piston 154 is provided with an actuating shaft 156 which is operatively associated with its companion cam 140. The piston 154 is spring biased into operative relation with the cam 140 by means of the spring 158 which is disposed in the cylinder 153. The casing 152 is further provided with an auxiliary chamber 160 having an inlet port 162 which communicates with the cylinder 153 and an outlet port 164 which communicates with the reservoir 166, the latter being adapted to contain the lubricating oil of the instant power transmission apparatus. It will be understood that the reservoir 166 is adapted to be normally filled to a desired level with a lubricating fluid whereby to lubricate the component parts of the instant apparatus. Positioned in the chamber 160 is a ball 168 which is spring biased into closing relation with the port 164 by means of the spring 170. Defined in the casing 152 is a chamber 172 which has a port 174 which is adapted for fluid communication with the cylinder 153. The chamber 172 is further provided with a port 176 which provides fluid communication between said chamber and the reservoir 166. The speed of rotation of the auxiliary rotor 78 is controlled by means of the adjustable screw 178 which carries the cone shaped valve 180 at its inner end, the latter being adapted to control the fluid flow through the port 174. Thus as the piston 154 reciprocates to the left viewing Fig. 1 fluid from the reservoir 166 will be drawn into the cylinder 153 and as said piston is reciprocated in an opposite direction said fluid will be discharged into the reservoir through the ports 174 and 176, the fluid flow through the port 174 being under the control of the valve 180 which as aforenoted is adjustable to control the speed of rotation of the auxiliary rotor 78. Thus, the further the valve 180 is unseated relative to the port 174, the greater will be the permitted amount of fluid flow through said port with the resultant effect of permitting an increase of the speed of rotation of the auxiliary rotor. Two such governors 148 and 150 are utilized in order to achieve more accurate control over the governed velocity of the auxiliary rotor as will be readily apparent. The casing part 20 is provided with a suitable removable plug 21 in order to provide access to the adjustable screw 178 for adjusting the governed velocity of rotation of the auxiliary rotor 78. It will also be noted that the adjusting screw 178 is provided with a suitable lock nut 182 in order to lock said adjustment screw in adjusted position.

From the above it will be apparent that the driving elements 100 are carried in radially projecting relation relative to the auxiliary rotor 78 and further it is to be noted that any number of driving elements may be provided, it being apparent that the number of apertures 96 provided in the auxiliary rotor 78 will correspond with the number of driving elements 100 provided.

If there is no appreciable load at the output shaft 62 of the apparatus 10 the latter will rotate as a unit in direct drive. More particularly, if there is no appreciable load on the output shaft 62, the input shaft 36 will rotate plate 46 in the direction of drive through the cooperative association of gear 38 and planetary gears 42 and 44, said planetary gears rotating with the internal gear 56 which is carried by the casing 12 whereby it will be apparent that under no load conditions the entire casing will rotate. Under no load conditions the planetary gears 42 and 44 do not move relative to the internal gear 56 but on the contrary said planetary gears rotate with said internal gear as a unit whereby the instant apparatus rotates as a fixed couple under no load conditions. Under these conditions the plate 46 will rotate carrying with it the main rotor 48 to which is secured the output shaft 62 which is operatively associated with the load. Accordingly under no load conditions the output shaft 62 and the casing 12 will rotate as a stationary couple, it being noted that under these conditions the planetary gears 42 and 44 do not move relative to the internal gear 56 but on the contrary rotate therewith. Under this same no load condition the main rotor 48 rotates about its axis constituted by the axes of the shafts 60 and 62 and the auxiliary rotor 78 which is adapted for rotation about the axis of the shaft 86 will be stationary or substantially stationary whereby the ball elements 110 will have no appreciable movement through the grooves 132. Thus under no load conditions the main rotor 48 will rotate about its axis whereas the auxiliary rotor 78 will be stationary and have no appreciable movement relative to the spiral grooves 132 of the casing 12. Thus, in summary, under no load conditions the rotation of the input shaft 36 will be effective to rotate the gear 38 carried thereby, the latter being effective to rotate the plate 46 and the internal gear 56, it being understood that under no load conditions there is no rotational movement between the projecting portions 56' and 54, respectively of the planetary gears 42 and 44 and the internal gear 56 in mesh therewith. The rotation of the plate 46 will be accordingly effective to rotate the output shaft 62, the rotation of the internal gear 56 being effective to rotate the casing 12 whereby it will be apparent that said casing and the output shaft will rotate in unison. Further under no load conditions as aforepointed out there will be no movement or substantially no movement of the auxiliary rotor 78 about its axis of rotation. It is to be noted that the axis of rotation of the main rotor 48 is disposed at righ angles to the axis of rotation of the auxiliary rotor 78 and said axes of rotation intersect at the spherical center of the inner spherical surface 130 of the inner casing parts 14 and 16. Thus the axes of rotation of the main and auxiliary rotors are disposed at right angles to each other and intersect at the geometric or spherical center of the inner casing parts 14 and 16.

When there is a load or resistance at the output shaft 62, the ball elements 110 will ride in their companion grooves as aforedescribed and said ball elements will coact with the sides of said grooves to impart to the casing parts 14 and 16 a twisting force in the direction of rotation which will be in an amount depending on the velocity of the input member 36 and the amount of resistance to be overcome at the output shaft 62. Under initial starting conditions with a load at shaft 62, the rotor 48 will rotate in the direction of rotation of the input shaft before the casing 12 rotates in said direction. Thus the resistance or load which is applied to the output shaft 62 will result in the movement of the ball elements 110 in the grooves 132. The coaction between the ball elements 110 and the sides of their companion grooves 132 allows a limited departure of the input forces from direct attack on the load, the amount of such departure being a function of the cut of the grooves and the velocity of the input shaft 36. The term direct attack as used herein refers to a locked condition in which the ball elements 110 are stationary in the grooves 132 and the input forces are transmitted to the output shaft without said elements moving in said grooves. The forces set up between the ball elements 110 and their companion grooves 132 limit the amount of rotational movement between the projecting portions 56' and 54, respectively of the planetary gears 42 and 44 and the internal gear 56 and the amount of separation will be a function of the force to be overcome at the output shaft 62 and the velocity of the input shaft 36. Thus the planetary gears 42 and 44, and the portions 56' and 54 on which the planetary gears rotate impose on the velocity of the input shaft 36 to move plate 46 in the same rotary direction as said input shaft on the application of resistance forces at the output shaft 62, and this imposition on the velocity of the input shaft 36 will be controlled or limited by the application of forces between the ball elements 110 and their companion grooves 132. As aforenoted the grooves 132 are cut to a spherical twist and are cut radially in two directions at right angles around a spherical center. It is within the scope of the present invention to cut said grooves spirally in any desired manner, it being understood that said grooves will be cut so as to achieve the desired efficiency of the instant apparatus. The cut of the grooves may be at a uniform velocity in said two directions at right angles around a spherical center or may be at a non-uniform velocity so as to secure the requisite efficiency as aforenoted. Accordingly, an important function of the ball elements and their companion grooves is to limit or control the independent movement between the internal gear and the planetary gears and this movement permits a limited departure of the input forces from direct attack to overcome the load at the output end 62 and the amount of such departure will be a function of the configuration of the grooves and the velocity of the input shaft 36. As aforenoted the instant power transmission apparatus is operative without the interposition of governing means although for certain applications it is desirable to govern the speed of rotation of the auxiliary rotor 78 whereby to achieve maximum efficiency. Thus the application of resistance forces at the output shaft 62 results in the departure of a limited predetermined amount of the input force from direct attack on the load, and the amount of departure will be a function of the configuration of the grooves and the velocity of the input shaft 36, it being understood that the balance of the generating input force is effective to overcome the load with the driving elements 100 exerting a torque in the direction of rotation of the output shaft 62. The relation of the limited predetermined velocity of the rotation of the auxiliary rotors 78, by the governing thereof, on its axis to the increasing velocity of the rotation of main rotor 78 on its axis effects an imposing challenge to the increasing velocity of rotation of the input shaft 36. Thus the interposition of governing means in the instant power transmission increases its efficiency by effecting the aforesaid challenge to the increasing velocity of rotation of shaft 36.

From the above it will be seen that the aforedescribed power transmission provides for power applied to an input member to be automatically converted to an optimum ratio with a maximum of efficiency, said ratio being a function of the resistance to be overcome and the velocity of rotation of the input shaft 36. The instant power transmission is adapted to automatically accommodate itself to sudden applications of power at the input or sudden increases of resistance at the output without adverse effect to the component parts of the transmission, it being understood that such sudden applications of power or sudden increases of resistance will be effective to set up forces between the ball elements 110 and their companion grooves 132 which in turn will be effective to control the independent movement between the internal gear 56 and the planetary gears 42 and 44, this action in turn resulting in the rotation of the auxiliary rotor 78 about its own axis, as aforedescribed.

In summary, if there is no appreciable load at the output shaft 62, the latter will rotate in direct drive at the same speed as the input shaft 36 and the casing 12, with the auxiliary rotor 78 being stationary or substantially stationary about its own axis, whereby the entire unit functions as a stationary couple. Under load conditions at the output shaft 62, the auxiliary rotor 78 will rotate about the axis thereof and the ball elements 110 will ride in their companion grooves 132 to thereby decrease the velocity of rotation of the casing 12 in the direction of rotation of the output shaft, said rotation of the auxiliary rotor effecting a torque conversion on the output shaft to overcome the load thereat and to increase the speed thereof until the entire unit functions as a stationary couple. The transmission of opposing forces to the ball and grooved elements is effected by the aforementioned fixed relation of the internal gear 56 to the grooves 132 and the fixed relation of the axis of the auxiliary rotor 78 to the axis of rotation of main rotor 48 and planetary gears 42 and 44. Thus the opposing force transmitted to the inclined plane of the grooves 132 causes the ball elements 110 to rotate on said inclined plane, the ball elements exerting a continuous torque in one direction while rotating in other directions. Thus the principle of this invention involves the movement of a rotary member, namely the rotor 48 or casing 20, to overcome a load coupled therewith by the application of forces moving in different directions on an internal radial plane based on a practical application of polar coordinates.

The present application is a continuation-in-part application of my application, Serial No. 287,706, filed May 14, 1952, and now abandoned.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. In power transmission apparatus, a casing having rotatable input means and output means adapted to be drivingly associated with said input means, and means for transmitting a predetermined ratio of the force applied to said input means to said output means comprising a main rotor disposed in said casing and mounted for rotation about an axis extending in one direction and operatively connected to said input and output means, and an auxiliary rotor carried by said main rotor for rotation about an axis extending at right angles to said first mentioned axis, and means for operatively associating said auxiliary rotor with said input means comprising a plurality of grooves defined in said casing, means carried by said auxiliary rotor and adapted for engagement in said grooves, and means providing for the rotation of said casing relative to said input means.

2. In power transmission apparatus, a casing having rotatable input means and output means adapted to be drivingly associated with said input means, and means for transmitting a predetermined ratio of the force applied to said input means to said output means comprising a main rotor disposed in said casing and mounted for rotation about an axis extending in one direction and operatively connected to said input and output means, and an auxiliary rotor carried by said main rotor for rotation about an axis extending at right angles to said first mentioned axis, and means for operatively associating said auxiliary rotor with said input means comprising a plurality of grooves defined in said casing, means carried by said auxiliary rotor and adapted for engagement in said grooves, and means providing for the rotation of said casing relative to said input means, said means providing for said relative rotation comprising planetary gears interposed between said casing and said input means.

3. In power transmission apparatus, a casing having rotatable input means and output means adapted to be drivingly associated with said input means, and means for transmitting a predetermined ratio of the force applied to said input means to said output means comprising a main rotor disposed in said casing and mounted for rotation about an axis extending in one direction and operatively connected to said input and output means, and an auxiliary rotor carried by said main rotor for rotation about an axis extending at right angles to said first mentioned axis, and means for operatively associating said auxiliary rotor with said input means comprising a plurality of grooves defined in said casing, means carried by said auxiliary rotor and adapted for engagement in said grooves, and means providing for the rotation of said casing relative to said input means, said means carried by said auxiliary rotor comprising radially extending members having a part adapted for engagement in said grooves during a predermined part of the rotation of said auxiliary rotor about its axis.

4. In power transmission apparatus, a casing having rotatable input means and output means adapted to be drivingly associated with said input means, and means for transmitting a predetermined ratio of the force applied to said input means to said output means comprising a main rotor disposed in said casing and mounted for rotation about an axis extending in one direction and operatively connected to said input and output means, and an auxiliary rotor carried by said main rotor for rotation about an axis extending at right angles to said first mentioned axis, and means for operatively associating said auxiliary rotor with said input means comprising a plurality of grooves defined in said casing, means carried by said auxiliary rotor and adapted for engagement in said grooves, and means providing for the rotation of said casing relative to said input means, said means carried by said auxiliary rotor comprising radially extending members having a part adapted for engagement in said grooves during a predetermined part of the rotation of said auxiliary rotor about its axis, and means providing for the engagement of said parts in said grooves during said predetermined part of the rotation of said auxiliary rotor.

5. In power transmission apparatus, a rotatable casing having rotatable input means and output means adapted to be drivingly associated with said input means, and means for transmitting a predetermined ratio of the force applied to said input means to said output means comprising a main rotor disposed in said casing and mounted for rotation about an axis extending in one direction and operatively connected to said input and output means, an auxiliary rotor carried by said main rotor for rotation about an axis extending at right angles to said first mentioned axis and intersecting the latter, and means for operatively associating said auxiliary rotor with said input means comprising a plurality of spiral grooves defined in an inner surface portion of said casing and radially extending members carried by said auxiliary rotor, said members having a part thereof formed complementary to said grooves and adapted to be received therein during a predetermined angular amount of each revolution of said auxiliary rotor about its axis.

6. In power transmission apparatus, a rotatable casing having rotatable input means and output means adapted to be drivingly associated with said input means, and means for transmitting a predetermined ratio of the force applied to said input means to said output means comprising a main rotor disposed in said casing and mounted for rotation about an axis extending in one direction and operatively connected to said input and output means, an auxiliary rotor carried by said main rotor for rotation about an axis extending at right angles to said first mentioned axis and intersecting the latter, and means for operatively associating said auxiliary rotor with said input means comprising a plurality of spiral grooves defined in an inner surface portion of said casing and radially extending members carried by said auxiliary rotor, said members having a part thereof formed complementary to said grooves and adapted to be received therein during a predetermined angular amount of each revolution of said auxiliary rotor about its axis, and planetary gears interposed between said input means and said casing whereby to provide for relative movement therebetween.

7. In power transmission apparatus, a rotatable casing having rotatable input means and output means adapted to be drivingly associated with said input means, and means for transmitting a predetermined ratio of the force applied to said input means to said output means comprising a main rotor disposed in said casing and mounted for rotation about an axis extending in one direction and operatively connected to said input and output means, an auxiliary rotor carried by said main rotor for rotation about an axis extending at right angles to said first mentioned axis and intersecting the latter, and means for operatively associating said auxiliary rotor with said input means comprising a plurality of spiral grooves defined in an inner surface portion of said casing and radially extending members carried by said auxiliary rotor, said members having a part thereof formed complementary to said grooves and adapted to be received therein during a predetermined angular amount of each revolution of said auxiliary rotor about its axis, and planetary gears interposed between said input means and said casing whereby to provide for relative movement therebetween, said radially extending members being axially reciprocable for engaging said parts in said grooves and disengaging said parts from said grooves, and means for axially reciprocating said members.

8. In power transmission apparatus, a rotatable casing having an inner spherical surface, spiral grooves defined in said inner spherical surface, rotatable input and output means carried by said casing, a main rotor disposed in said casing and mounted for rotation about an axis coaxial with the axis of rotation of said input means, said rotor being operatively connected to said input and output means, an auxiliary rotor carried by said main rotor for rotation about an axis disposed at right angles to said main rotor axis, said auxiliary rotor having a plurality of members having parts formed complementary to said grooves and adapted to engage therein during a predetermined angular movement of said auxiliary rotor about its axis, and planetary gears interposed between said casing and said input means for providing relative angular movement therebetween, said parts being adapted to ride in said grooves on the application of a load on said output means and the interengagement between said parts and said grooves being effective to limit the relative angular movement betwen said casing and said input means.

9. In power transmission apparatus, a rotatable casing having an inner spherical surface, spiral grooves defined in said inner spherical surface, rotatable input and output means carried by said casing, a main rotor disposed in said casing and mounted for rotation about an axis coaxial with the axis of rotation of said input means, said rotator being operatively connected to said input and output means, an auxiliary rotor carried by said main rotor for rotation about an axis disposed at right angles to said main rotor axis, said auxiliary rotor having a plurality of members having parts formed complementary to said grooves and adapted to engage therein during a predetermined angular movement of said auxiliary rotor about its axis, and planetary gears interposed between said casing and said input means for providing relative angular movement therebetween, said parts being adapted to ride in said grooves on the application of a load on said output means and the interengagement between said parts and said grooves being effective to limit the relative angular movement between said casing and said input means, said main and auxiliary rotor axes intersecting at the spherical center of said inner spherical surface.

10. In power transmission apparatus, a rotatable casing having an inner spherical surface, spiral grooves defined in said inner spherical surface, rotatable input and output means carried by said casing, a main rotor disposed in said casing and mounted for rotation about an axis coaxial with the axis of rotation of said input means, said rotor being operatively connected to said input and output means, an auxiliary rotor carried by said main rotor for rotation about an axis disposed at right angles to said main rotor axis, said auxiliary rotor having a plurality of axially reciprocable members having parts formed complementary to said grooves and adapted to engage therein during a predetermined angular movement of said auxiliary rotor about its axis, means for reciprocating said members for engaging said parts in said grooves and disengaging said parts therefrom, and planetary gears interposed between said casing and said input means for providing relative angular movement therebetween, said parts being adapted to ride in said grooves on the application of a load on said output means and the interengagement between said parts and said grooves being effective to limit the relative angular movement between said casing and said input means.

11. In power transmission apparatus, a rotatable casing having an inner spherical surface, spiral grooves defined in said inner spherical surface, rotatable input and output means carried by said casing, and means for transmitting a predetermined ratio of the force applied to said input means to said output means comprising a main rotor disposed in said casing and mounted for rotation about an axis coaxial with the axis of rotation of said input means, said rotor being operatively connected to said input and output means, an auxiliary rotor carried by said main rotor for rotation about an axis disposed at right angles to said main rotor axis, said auxiliary rotor having a plurality of members having parts formed complementary to said grooves and adapted to engage therein during a predetermined angular movement of said auxiliary rotor about its axis, and planetary gears interposed between said casing and said input means for providing relative angular movement therebetween.

12. In power transmission apparatus, a rotatable casing having an inner spherical surface, spiral grooves defined in said surface, rotatable input and output means carried by said casing, and means for transmitting a predetermined ratio of the force applied to said input means to said output means comprising a main rotor disposed in said casing and mounted for rotation about an axis extending in one direction and operatively connected to said input and output means, an auxiliary rotor carried by said main rotor for rotation about an axis extending at right angles to said first mentioned axis, and means for operatively associating said auxiliary rotor with said input means comprising means carried by said auxiliary rotor and adapted for cooperative association with said grooves, and means providing for relative movement between said casing and said input means.

13. In power transmission apparatus, a rotatable casing having an inner spherical surface, spiral grooves defined in said surface, rotatable input and output means carried by said casing, and means for transmitting a predetermined ratio of the force applied to said input means to said output means comprising a main rotor disposed in said casing and mounted for rotation about an axis extending in one direction and operatively connected to said input means by planetary gears, an auxiliary rotor carried by said main rotor for rotation about an axis extending at right angles to said first mentioned axis, and means for operatively associating said auxiliary rotor with said input means comprising means carried by said auxiliary rotor and adapted for cooperative association with said grooves, said planetary gears providing for relative angular movement between said casing and input means.

14. In power transmission apparatus, a rotatable casing having an inner spherical surface, spiral grooves defined in said surface, rotatable input and output means carried by said casing, and means for transmitting a predetermined ratio of the force applied to said input means to said output means comprising a main rotor disposed in said casing and mounted for rotation about an axis extending in one direction and operatively connected to said input means by planetary gears, an auxiliary rotor carried by said main rotor for rotation about an axis extending at right angles to said first mentioned axis, and means for operatively associating said auxiliary rotor with said input means comprising means carried by said auxiliary rotor and adapted for cooperative association with said grooves, said planetary gears providing for relative angular movement between said casing and input means, and means for governing the speed of rotation of said auxiliary rotor.

15. In power transmission apparatus, a rotatable casing having rotatable input means and output means adapted to be drivingly associated with said input means, and means for transmitting a predetermined ratio of the force applied to said input means to said output means comprising a main rotor disposed in said casing and mounted for rotation about an axis extending in one direction and operatively connected to said input and output means, an auxiliary rotor carried by said main rotor for rotation about an axis extending at right angles to said first mentioned axis and intersecting the latter, and means for operatively associating said auxiliary rotor with said input means comprising a plurality of spiral grooves defined in an inner surface portion of said casing and radially extending members carried by said auxiliary rotor, said members having a part thereof formed complementary to said grooves and adapted to be received therein during a predetermined angular amount of each revolution of said auxiliary rotor about its axis, and means for governing the speed of rotation of said auxiliary rotor.

16. In power transmission apparatus, a rotatable casing having an inner spherical surface, spiral grooves defined in said inner spherical surface, rotatable input and output means carried by said casing, a main rotor disposed in said casing and mounted for rotation about an axis coaxial with the axis of rotation of said input means, said rotor being operatively connected to said input means by planetary gears mounted in fixed relation with said rotor, an auxiliary rotor carried by said main rotor for rotation about an axis disposed at right angles to said main rotor axis, said auxiliary rotor having a plurality of members having parts formed complementary to said grooves and adapted to engage therein during a predetermined angular movement of said auxiliary rotor about its axis, said planetary gears being interposed between said casing and said input means for providing relative angular movement therebetween, the interengagement between said parts and said grooves being effective to control the relative angular movement between said casing and said input means.

17. In power transmission apparatus provided with a casing, input means, and output means adapted to be drivingly associated with said input means, means for transmitting a predetermined ratio of the force applied to said input means to said output means comprising a main rotor disposed in said casing and mounted for rotation about an axis extending in one direction and operatively connected to said input and output means, an auxiliary rotor operatively connected to said main rotor for rotation about an axis angularly disposed relative to said first mentioned axis, and means for operatively associating said auxiliary rotor with said input means comprising a plurality of grooves defined in said casing, and means carried by said auxiliary rotor for engagement in said grooves.

18. In power transmission apparatus provided with a casing having rotatable input means, and output means adapted to be drivingly associated with said input means, means for transmitting a predetermined ratio of the force applied to said input means to said output means comprising rotatable means disposed in said casing and mounted for rotation coaxial of said input means and operatively connected to said input and output means, means operatively connected to said rotatable means disposed in said casing for rotation about an axis angularly disposed relative to the axis of rotation of last mentioned rotatable means, and means for operatively associating said means rotatable about said angularly disposed axis with said input means comprising a plurality of grooves defined in said casing, and means carried by said means rotatable about said angularly disposed axis for engagement in said grooves.

References Cited in the file of this patent

UNITED STATES PATENTS

| Number | Name | Date |
| --- | --- | --- |
| 1,282,495 | Tornberg | Oct. 22, 1918 |
| 1,544,834 | Godder | July 7, 1925 |
| 1,694,554 | Murray | Dec. 11, 1928 |
| 1,758,252 | Gardner | May 13, 1930 |
| 1,776,469 | Gardner | Sept. 23, 1930 |
| 1,861,376 | Beall | May 31, 1932 |
| 1,877,765 | Jeffreys | Sept. 20, 1932 |
| 2,092,437 | Weiss | Sept. 7, 1937 |
| 2,310,724 | Whitlow | Feb. 9, 1943 |
| 2,470,390 | Consier | May 17, 1949 |
| 2,520,057 | Pulese | Aug. 22, 1950 |